United States Patent
Huynh et al.

(10) Patent No.: US 8,244,467 B2
(45) Date of Patent: Aug. 14, 2012

(54) METHOD AND DEVICE FOR DETERMINING A RELIABLE POSITION OF AN AIRCRAFT

(75) Inventors: Jean-Philippe Huynh, Tournefeuille (FR); Alain Guillet, Blagnac (FR); Stéphane Dattler, Montlaur (FR); Grégory Ortet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 297 days.

(21) Appl. No.: 12/663,283

(22) PCT Filed: Jun. 16, 2008

(86) PCT No.: PCT/FR2008/000830
§ 371 (c)(1),
(2), (4) Date: Dec. 6, 2009

(87) PCT Pub. No.: WO2009/010650
PCT Pub. Date: Jan. 22, 2009

(65) Prior Publication Data
US 2010/0169014 A1    Jul. 1, 2010

(30) Foreign Application Priority Data
Jun. 25, 2007    (FR) ..................... 07 04528

(51) Int. Cl.
*G01C 21/00* (2006.01)
(52) U.S. Cl. .................. 701/468; 701/3; 342/357.31
(58) Field of Classification Search .................. 701/3, 4, 701/9, 14, 213, 214; 342/357.31
See application file for complete search history.

(56) References Cited

U.S. PATENT DOCUMENTS

| | | | |
|---|---|---|---|
| 5,512,903 A | | 4/1996 | Schmidtke |
| 5,663,732 A | * | 9/1997 | Stangeland et al. ..... 342/357.31 |
| 5,760,737 A | | 6/1998 | Brenner |
| 6,157,891 A | * | 12/2000 | Lin ............................... 701/301 |
| 6,161,062 A | * | 12/2000 | Sicre et al. ........................ 701/3 |
| 6,456,938 B1 | * | 9/2002 | Barnard ......................... 701/213 |
| 7,248,964 B2 | * | 7/2007 | Bye ............................... 701/200 |
| 7,474,962 B2 | * | 1/2009 | Waid et al. ..................... 701/213 |
| 7,899,585 B2 | * | 3/2011 | Rouquette et al. ................. 701/9 |
| 2004/0245408 A1 | | 12/2004 | Peyrucain |
| 2007/0016371 A1 | * | 1/2007 | Waid et al. ..................... 701/213 |
| 2007/0115140 A1 | * | 5/2007 | Bateman et al. ............. 340/945 |
| 2008/0088504 A1 | * | 4/2008 | Dutton ...................... 342/357.04 |
| 2008/0140269 A1 | * | 6/2008 | Naimer et al. ..................... 701/7 |
| 2008/0154447 A1 | * | 6/2008 | Spinelli ........................... 701/7 |

FOREIGN PATENT DOCUMENTS

EP    1 464 576    10/2004

OTHER PUBLICATIONS

International Search Report dated Feb. 3, 2009 w/ English translation.
Written Opinion of the International Searching Authority with English translation.
C. Call, et al., "Performance of Honeywell's Inertial/GPS Hybrid (HIGH) for RNP Operations," Position, Location, and Navigation Symposium, 2006, IEEE/ION, Coronado, CA, Apr. 25-27, 2006, Piscataway, NJ, USA, IEEE, Apr. 25, 2006, pp. 244-252.

* cited by examiner

*Primary Examiner* — Helal A Algahaim
(74) *Attorney, Agent, or Firm* — Dickinson Wright PLLC

(57) ABSTRACT

The invention relates to a method and device for determining a reliable position of an aircraft. The device (1) includes means (3, 10) for determining different aircraft position values and means (8, 16, 18) for deducing a reliable position therefrom, using coherence tests and a consolidation method.

8 Claims, 5 Drawing Sheets

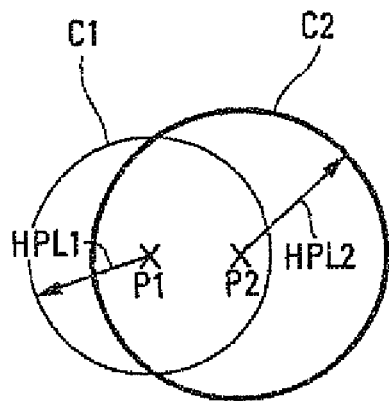 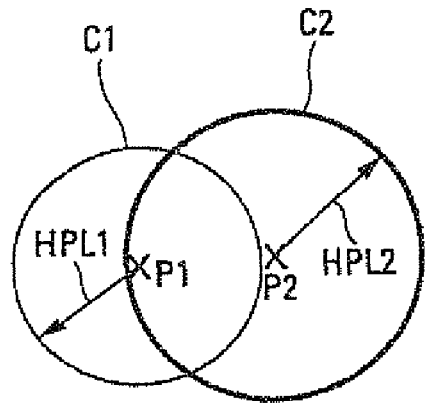
Fig. 2A                Fig. 2B
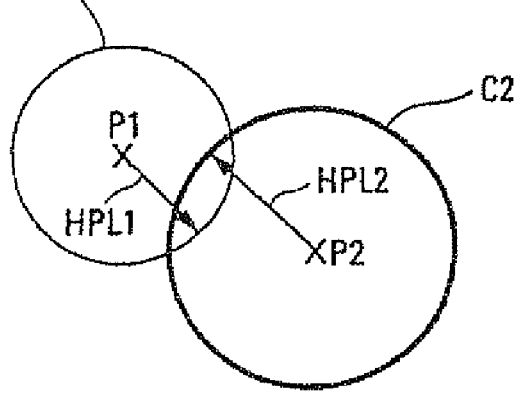 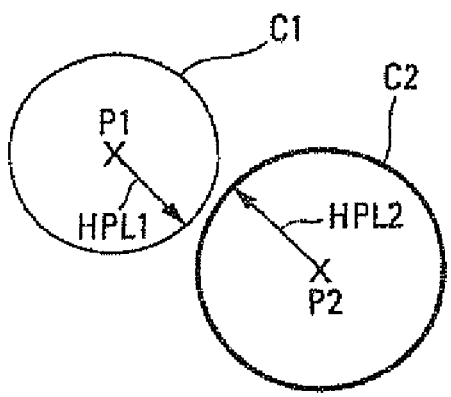
Fig. 3A                Fig. 3B
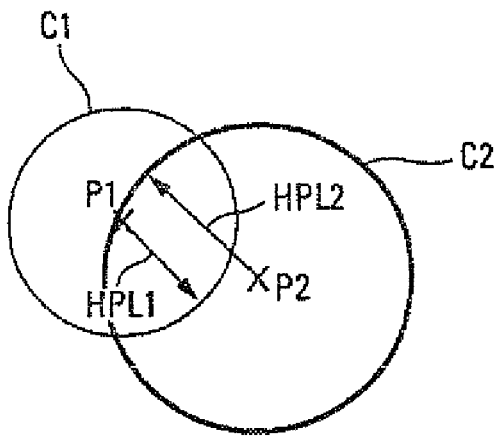 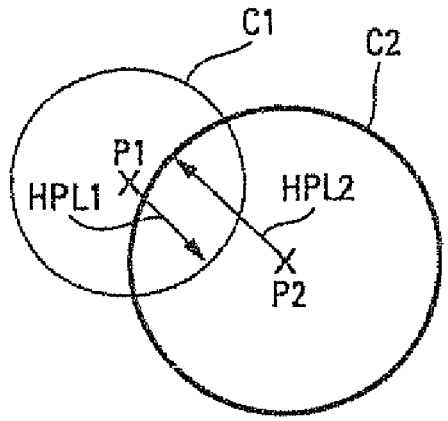
Fig. 4A                Fig. 4B

METHOD AND DEVICE FOR DETERMINING A RELIABLE POSITION OF AN AIRCRAFT

The present invention relates to a method and a device for determining a reliable current position of an aircraft, particularly a transport airplane.

To guide an aircraft in the most accurate manner possible, it is necessary to have available, in real time, information relating to its position, which is very reliable. This will be particularly true with future precision aerial operations of RNP AR type ("Required Navigation Performance with Approbation Required"), on approach and on takeoff, which make it a requirement to navigate inside a corridor and not to depart therefrom. Relief or other aircraft may potentially be situated outside this corridor. Patent application FR-2 887 329 describes a particular display device which is adapted to an operation or procedure of RNP type. According to such a procedure, the aircraft is generally guided in accordance with a predetermined flight plan, while having to comply with strict performance constraints.

Moreover, it is known that in general the operations of RNP type are operations which are carried out essentially with the aid of routine receivers associated with a satellite global navigation system of GNSS type ("Global Navigation Satellite System") which encompasses the gamut of existing satellite navigation systems (GPS, Galileo, etc.), with the aid of an inertial system, and with the aid of at least one flight management system for example of FMS type.

Generally, the flight management system or systems compute a position of the aircraft for the remainder of the other onboard user systems. Accordingly, each flight management system uses, in general, either information received directly from said receivers of GNSS type (that is to say receivers associated with said GNSS system), or hybrid information using inertial data, to implement a selection algorithm and to construct (calculate) a position of the aircraft. It will be noted that patent application FR-2 888 643 describes a method for determining a ground position of an airplane using inertial data.

Now, the position calculation is implemented in a flight management system according to a simple chain, which is effected with software of DAL C type or of DAL B type. Moreover, the GNSS receiver and the inertial system are at least of DAL B type. Hence, these various means do not make it possible to determine a reliable position of the aircraft (including in degraded cases), capable of supporting critical aerial operations, such as future aforementioned operations of RNP AR type.

It is known that one of the major problems posed by the operations of RNP AR type is that they are based on the use of a position that is very reliable, both horizontally and vertically.

At the present time, the operations of RNP AR type are still regarded as non-precision approach operations and are therefore compatible with the use of a routine flight management system for the calculation of position. However, one of the characteristics of the operations of RNP AR type is that the aircraft must journey along a precise path in space to avoid much closer potential obstacles (mountain, etc.) than is commonly carried out today.

Moreover, even if from a current regulatory point of view, the specific reliability requirement is satisfied with the aforementioned routine architectures, there will be a significant advantage in having in the future an architecture that is significantly more robust to positional failures in the context of said future operations of RNP AR type, which will be regarded as precision operations.

Moreover, a device for aiding the piloting of an aircraft during a non-precision approach in a landing phase is known through document EP-1 464 576. The object of this device is to assess the integrity, precision and availability of measurements and information, and especially of position values for the aircraft, which are provided by onboard equipment. Accordingly, regarding the position values, this prior document makes provision:
  to evaluate the integrity and the precision of said position values;
  to verify the consistency between a position value (for the aircraft), calculated by a flight management computer FMS, and a position value received from a GPS system; and
  in order to verify this consistency, to simply calculate the difference between the two position values and to compare it with a predetermined value.

The object of the present invention is to remedy the aforementioned drawbacks. It relates to a method which makes it possible to determine a particularly reliable position of an aircraft, doing so without having to significantly modify the means, especially the computers, currently existing on an aircraft for implementing this method, and without disturbing the existing user systems.

For this purpose, according to the invention, said method according to which, in a step a), at least three first position values which each relate to the current position of the aircraft are produced, each of these three first position values is produced on the basis of information arising respectively from onboard receivers which are associated with a satellite positioning system, for example of GNSS type, is noteworthy in that the following operations are moreover carried out:
  b) consistency tests are implemented to verify whether or not these first position values are mutually consistent, these consistency tests (specified below) making it possible to declare for each of said first position values whether or not it is valid in terms of reliability;
  c) at least two second position values which each relate to the current position of the aircraft and which correspond to hybrid position values are calculated with the aid of said first position values and with the aid of inertial information;
  d) consistency tests are implemented to verify whether said second position values are mutually consistent, these consistency tests making it possible to declare for each of said second position values whether or not it is valid in terms of reliability; and
  e) on the basis of at least certain of said first and second position values which have been declared valid by means of the consistency tests implemented in said steps b) and a (so-called consolidated) reliable current position of the aircraft is determined with the aid of a consolidation scheme (specified below).

This reliable current position of the aircraft can be transmitted to any type of user system onboard the aircraft.

Thus, by virtue of the invention, and especially by virtue:
  of the consideration of two types of position values, namely said first position values which are produced with the aid of the information provided by onboard receivers and said second position values which are calculated with the aid of these first position values and inertial information;
  of the consideration only of first and of second position values which have been declared valid in terms of reliability; and
  of the implementation of a particular consolidation scheme, specified below,
a particularly reliable position of the aircraft is obtained.

Furthermore, as specified further below, to implement said method, it is not necessary to overly modify, structurally and electrically, the existing systems (especially the computers). Moreover, the implementation of said method has no repercussions on the user systems, which therefore need not be modified when they use the reliable position determined with the aid of the method in accordance with the invention.

In an advantageous manner, in steps a) and c), a probability space is determined for each position value, each probability space being centered around the corresponding position value and defining the volume in which, with a probability greater than a predetermined threshold (for example $10^{-7}$/flying hour or $10^{-9}$/flying hour), the actual position of the aircraft is situated.

Furthermore, according to the invention, said consistency tests [implemented in step b) or in step d)] consist in testing pairwise (first or second) position values, and each consistency test consists in determining a threshold value which depends on the radii of the probability spaces associated with the two tested position values and in comparing the distance between these two position values with said threshold value, so that, if said distance is greater than this threshold value, a problem of reliability exists between the two tested position values. If a reliability problem exists, it is possible to determine the position value which is not valid by carrying out consistency tests pairwise with at least two different position values.

Moreover, it will be noted that the aforementioned document EP-1 464 576 does not disclose, in particular, the following characteristics of the present invention:
  determining, that is to say calculating, a reliable position. Indeed, this prior document provides only for verifying the reliability of position values which are obtained in a routine manner;
  implementing the particular series of aforementioned steps a) to e) to calculate the reliable position;
  calculating this reliable position on the basis of first and second position values of different origins, which have previously been declared valid; and
  using the aforementioned particular consistency tests, which are based on a calculation of probability spaces, to verify the consistency between position values.

Preferably, the consistency tests implemented in step b) or in step d) are carried out in at least two different computers, thereby making it possible to protect the implementation of the method in accordance with the invention against a possible failure of one of said computers.

In a particular embodiment, if a (first or second) position value is declared invalid in one of steps b) and d), a fault of an onboard technical means is indicated, which is responsible for the lack of reliability of this position value.

Moreover, according to the invention, the consolidation scheme implemented in step e) and specified below, can also be used in steps b) and d) to determine a first auxiliary reliable position or a second auxiliary reliable position, on the basis of said first position values or of said second position values. Such a first so-called consolidated auxiliary reliable position can be transmitted to a user system which customarily uses one of said first position values. This applies by analogy to the second so-called consolidated auxiliary reliable position.

It will be noted that the above characteristics can also be applied to third position values which correspond to (current) inertial positions of the aircraft and which are determined by an inertial system. These third position values can represent said inertial information also used to calculate said second position values.

Furthermore, in order to increase the precision of the calculation of said second position values (hybrid position values), in step c), these second position values are determined only with the aid of first position values which have previously been declared valid [in step b)].

Furthermore, a preferred consolidation scheme consists:
  α) in conducting consistency tests to verify all the pairs of position values, for example a first position value and a second position value, with the aim of eliminating a position value that may be unreliable with respect to the others. Such a consistency test can be based, for example, on the deviation between each position value and on the probability space associated with each position value;
  β) in conducting performance tests to identify, from among the position values tested as consistent (that is to say reliable) in step α), the best pair of position values, namely that exhibiting the best reliability. Such a performance test can be based, for example, on the deviation between each position value and on the probability space associated with each position value; and
  γ) in calculating, on the basis of the best pair of position values determined in step β), an intermediate position value, as well as an associated probability space. This intermediate position value can correspond, for example, to the mean or to a weighted barycenter of the position values of said best pair. This intermediate position value represents the most reliable calculable position value (that is to say the aforementioned consolidated reliable current position).

This consolidation scheme is valid if there exist at least two available position values. It is however more effective if there exist at least three available position values.

Preferably, said consolidation scheme is implemented in at least two different computers, thereby making it possible to protect the implementation of the method in accordance with the invention against a possible failure of one of said computers.

Moreover, in a particular embodiment, in step a), two of said receivers used are intended in a routine manner for navigation, and a third of said receivers used is intended solely for monitoring. This makes it possible in principle to always have a first position value, since the simultaneous loss of the position in respect of monitoring and navigation is very improbable.

The present invention also relates to a device for determining a reliable position of an aircraft, in particular of a transport airplane.

According to the invention, said device of the type comprising a system able to produce at least three first position values which each relate to the current position of the aircraft, said system comprising onboard receivers which are associated with a satellite positioning system (for example of GNSS type) and which are, each, able to provide information making it possible to produce a first position value, is noteworthy in that it comprises moreover:
  first means for implementing consistency tests making it possible to verify whether these first position values are mutually consistent, these consistency tests making it possible to declare for each of said first position values whether or not it is valid in terms of reliability;
  second means for calculating, with the aid of said first position values and with the aid of inertial information, at least two second position values which each relate to the current position of the aircraft and which correspond to hybrid position values;
  third means for implementing consistency tests making it possible to verify whether said second position values are mutually consistent, these consistency tests making it possible to declare for each of said second position values whether or not it is valid in terms of reliability; and fourth means for determining, on the basis of at least certain of said first and second position values which have been declared valid by said first and third means, a reliable current position of the aircraft, by implementing a consolidation scheme.

The present invention also relates to an aircraft fitted with such a device.

The figures of the appended drawing will elucidate the manner in which the invention may be embodied. In these figures, identical references designate similar elements.

FIGS. 2A, 2B, 3A, 3B, 4A and 4B are diagrams which make it possible to properly explain the characteristics of a consistency test in accordance with the invention.

Figure 1:
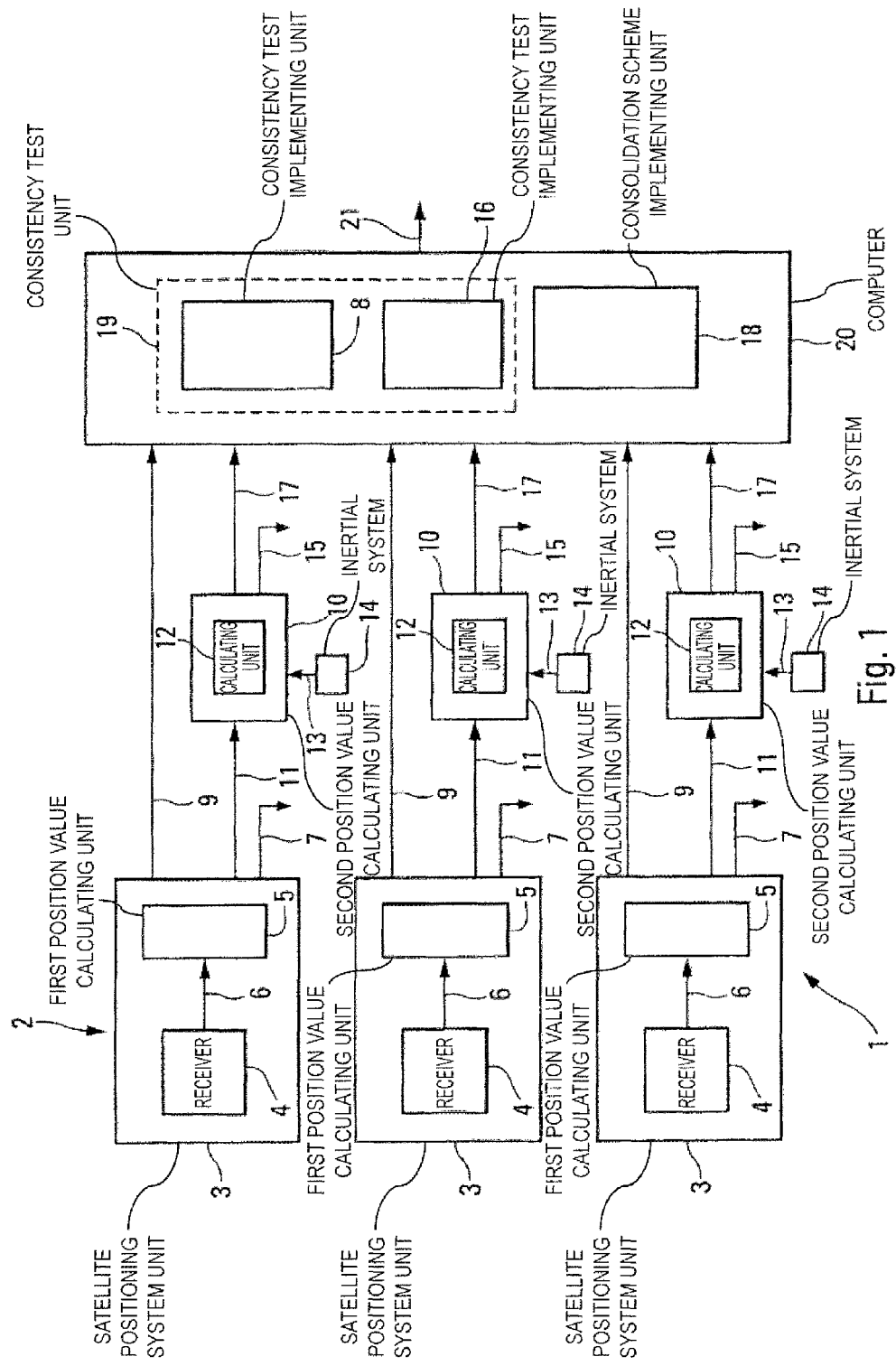
FIGS. 1 and 5 to 7 are schematic diagrams of various embodiments of a device in accordance with the invention.

The device 1 in accordance with the invention and schematically represented in FIG. 1 is carried onboard an aircraft, in particular a transport airplane, not represented, and is intended to determine in real time a current position of this aircraft, which current position must be very reliable.

Said device 1 is of the type comprising a system 2 which is able to produce at least three first position values. Each of these first position values is a value indicating the current position of the aircraft. Said system 2 comprises units 3 which are associated with a satellite positioning system, preferably with a satellite global navigation system of GNSS type ("Global Navigation Satellite System") which encompasses the gamut of existing satellite navigation systems (GPS, Galileo, etc). These units 3 are each able to produce at least one first position value.

In a routine manner, each of these units 3 comprises:
a routine receiver 4, furnished with an antenna, which makes it possible in particular to receive information from satellites forming part of said satellite positioning system; and
calculation means 5 which are connected by way of a link 6 to said receiver 4 and which are formed so as to determine, in a routine manner, on the basis of the information received, a first position value.

These units 3 can transmit, in a routine manner, this position information to user systems (not represented) of the aircraft, by way of a link 7.

According to the invention, said device 1 comprises moreover:
means 8 for implementing consistency tests making it possible to verify whether the first position values, received from said units 3 on each occasion by way of a link 9, are mutually consistent. These consistency tests specified below make it possible to declare, for each of the first position values received from said units 3, whether or not it is valid in terms of reliability;
units 10 which are each connected by way of a link 11 to said units 3 (especially in the example of FIG. 1) and which are formed so as to calculate, in a routine manner, second position values which each represent the current position of the aircraft and which correspond to hybrid position values. Accordingly, said units 10 each comprise a calculation means 12 which determines a second position value on the basis of a first position value received from a unit 3 and on the basis of inertial information received by way of a link 13 from means 14. The various means 14 can form part of a routine inertial system;

means 16 which implement consistency tests making it possible to verify whether the second position values received by way of links 17 from said units 10 are mutually consistent. These consistency tests specified below make it possible to declare, for each of these second position values, whether or not it is valid in terms of reliability; and means 18 for determining, on the basis of at least certain of said first and second position values which have been declared valid by said means 8 and 16, a reliable current position of the aircraft, by implementing a consolidation scheme specified below.

In a particular embodiment, said means 8 and 16 form part of one and the same unit 19 which carries out all the consistency tests, and said means 8, 16 and 18 are integrated into a computer 20 which is able to transmit the results of the processings carried out by these means 8, 16 and 18, and especially said reliable position of the aircraft, by way of a link 21 to routine user systems (not represented) of the aircraft.

Furthermore, the units 3 are, for example, landing aid multimode receivers of MMR type ("Multi Mode Receiver").

Thus, by virtue of the invention, and especially by virtue:
of the consideration of two types of position values, namely said first position values which are produced (by the units 3) with the aid of the information provided by onboard receivers 4 and said second position values which are calculated (by the units 10) with the aid of these first position values and inertial information;
of the consideration (by the means 18) only of first and of second position values which have been declared valid in terms of reliability (by the means 8 and 16); and
of the implementation (by the means 18) of a particular consolidation scheme, specified below, the device 1 makes it possible to calculate and to transmit, in real time, a particularly reliable, current position of the aircraft.

Furthermore, to make said device 1, it is not necessary to overly modify, structurally and electrically, the existing systems (especially the computers). Moreover, this device 1 has no repercussions on the user systems, which therefore need not be modified when they use the reliable position determined by it.

Said means 5 determine, in addition to each first position value, an associated probability space. Each probability space is centered around the corresponding first position value and defines the volume in which, with a probability greater than a predetermined threshold (for example $10^{-7}$/flying hour or $10^{-9}$/flying hour), the (current) actual position of the aircraft is situated.

Likewise, said means 12 also determine, for each second position value, an associated probability space. In this case, each probability space is centered around the corresponding second position value, and it defines the volume in which, with a probability greater than a predetermined threshold (for example $10^{-7}$/flying hour or $10^{-9}$/flying hour), the (current) actual position of the aircraft is situated.

In a particular embodiment, the consistency tests implemented by said means 8 consist in testing pairwise first position values received from said units 3. Likewise, said consistency tests implemented by said means 16 consist in testing pairwise second position values received from said units 10. It will be noted that said test means, instead of being integrated into the computer 20, can also be integrated into each of said units 3 and into each of said units 10.

In a preferred embodiment, to implement a consistency test with (first or second) position values P1 and P2, the means 8 and/or the means 16 comprise:

an element for determining a threshold value VS which depends on the radii HPL1 and HPL2 of the probability spaces (illustrated by circles C1 and C2 in FIGS. 2A to 4B) associated with the two position values P1 and P2 tested; and an element for comparing the distance P1 P2 between these two position values P1 and P2 with said threshold value VS, so that, if said distance P1 P2 is greater than this threshold value VS, a problem of reliability (or of consistency) exists between these two position values P1 and P2 tested.

If a reliability problem exists, the means 8 and 16 can determine the position value which is not valid by carrying out consistency tests, pairwise, with at least two different position values.

In a first example represented in FIGS. 2A and 2B, said threshold value VS corresponds to the minimum value of the radii HPL1 and HPL2. In this case:

in the example of FIG. 2A, as P1 P2<VS, the two values P1 and P2 are mutually consistent; and in the example of FIG. 23, as P1 P2>VS, the two values P1 and P2 are not mutually consistent.

In this first example, two position values P1 and P2 are mutually consistent if each circle C1, C2 illustrating a probability space encompasses the center of the other circle.

In a second example represented in FIGS. 3A and 33, said threshold value VS corresponds to the sum of the radii HPL1 and HPL2. In this case:

in the example of FIG. 3A, as P1 P2<VS, the two values P1 and P2 are mutually consistent; and in the example of FIG. 33, as P1 P2>VS, the two values P1 and P2 are not mutually consistent.

In this second example, two position values P1 and P2 are mutually consistent if the two corresponding circles C1 and C2 exhibit an intersection.

Furthermore, in a third example represented in FIGS. 4A and 42, said threshold value VS corresponds to the maximum value of the radii HPL1 and HPL2. In this case:

in the example of FIG. 4A, as P1 P2<VS, the two values P1 and P2 are mutually consistent; and in the example of FIG. 4B, as P1 P2>Vs, the two values P1 and P2 are not mutually consistent.

In this third example, two position values P1 and P2 are mutually consistent if at least one circle C1, C2 encompasses the center P1, P2 of the other circle.

Preferably, the consistency tests implemented by the means 8 and those implemented by the means 16 are carried out in at least two different computers, thereby making it possible to protect the processings in accordance with the invention against a possible failure of one of said computers.

Figure 5:
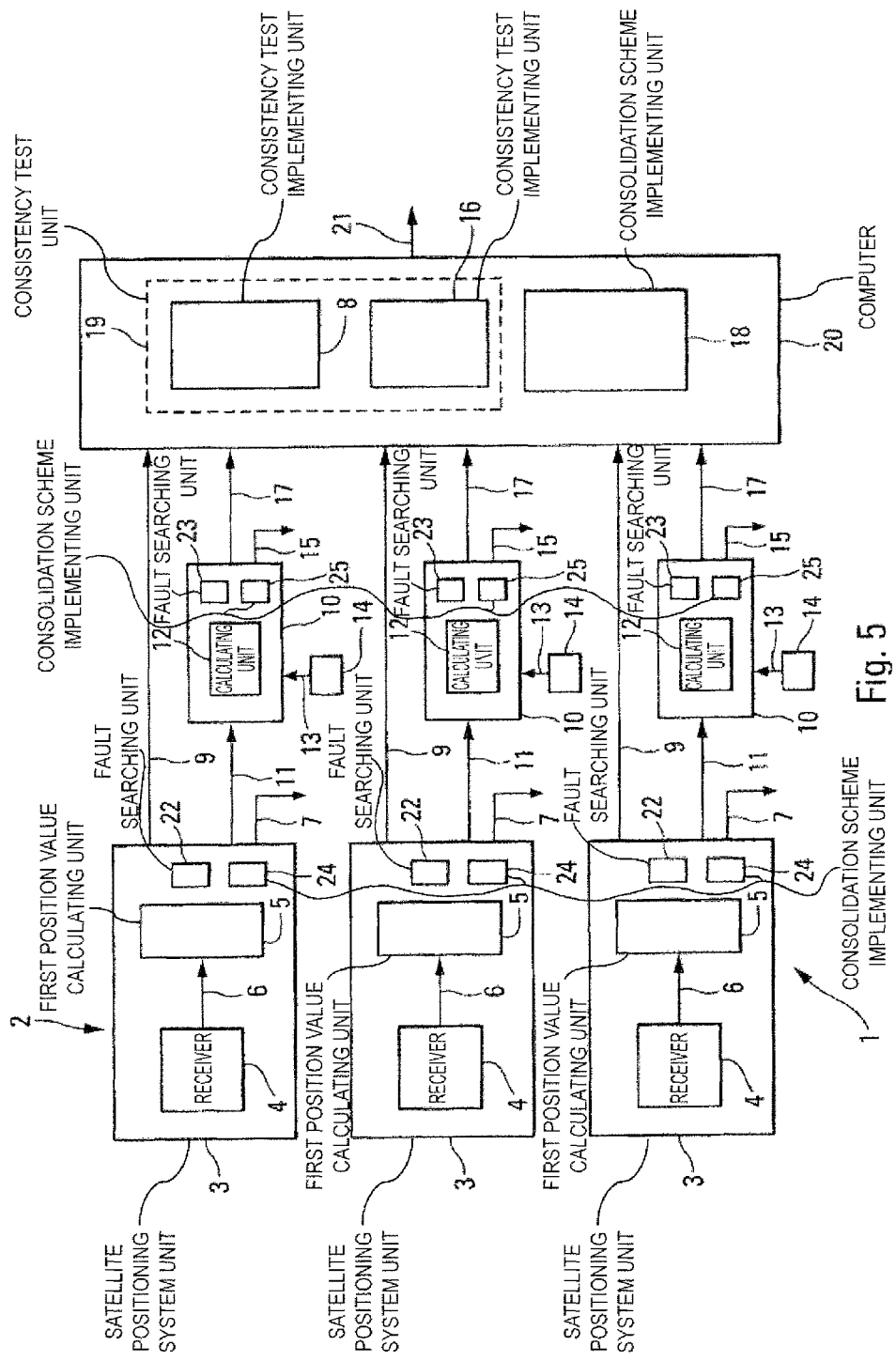

In a particular embodiment, the device 1 comprises, as represented in FIG. 5, means 22 which are for example integrated into each unit 3 and which are formed so as to search for (and then to indicate) a fault of an onboard technical means, in particular of the receiver 4, when a first position value has been declared invalid with the aid of a consistency test of the aforementioned type.

Furthermore, in a particular embodiment, said device 1 also comprises means 23 (represented in FIG. 5) which are for example integrated into each unit 10 and which are formed so as to search for (and then to indicate) a fault of an onboard technical means, when a second position value has been declared invalid with the aid of a consistency test of the aforementioned type.

Furthermore, in a particular embodiment, in order to increase the precision of the calculation of the second position values (hybrid position values), the units 10 determine these second position values only with the aid of first position values which have previously been declared valid.

Moreover, to implement a consolidation scheme, said means 18 comprise elements (not represented):

α) intended to conduct consistency tests to verify all the pairs of position values, for example a first position value and a second position value, so as to eliminate any position value which is unreliable with respect to the others. Such a consistency test can be based, for example, on the deviation between each position value $P_i$, $P_j$ and on the probability space $HPL_i$, $HPL_j$ associated with each position value $P_i$, $P_j$;

β) intended to conduct performance tests to identify, from among the position values tested as consistent, the best pair of position values, that is to say that exhibiting the best reliability. Such a performance test can be based, for example, on the deviation between each position value and on the probability space associated with each position value; and γ) intended to calculate, on the basis of the thus determined best pair of position values, an intermediate position value, as well as an associated probability space. This intermediate position value can correspond, for example, to the mean or to a weighted barycenter of the position values of said best pair. This intermediate position value represents the most reliable calculable position value (that is to say the aforementioned consolidated reliable current position Pc).

This consolidation scheme is valid if there exist at least two available position values. It is of course more effective if there exist at least three available position values, for example three or four position values.

The aforementioned step β) therefore consists in determining from among the consistent pairs the best pair. The criterion for finding this best pair is the following: $P_i$ and $P_j$ is the best pair if and only if the sum $HPL_i + HPL_j + (P_i - P_j)$ is a minimum.

Furthermore, the aforementioned step γ) consists in determining the consolidated position Pc. This can be carried out according to one of two different options:

a) option 1: Pc is the median of $P_i$ and $P_j$, that is to say $Pc = \frac{1}{2}|P_i + P_j|$;

b) option 2: Pc is the weighted barycenter of $P_i$ and $P_j$, that is to say $$|P_i - P_c| = q|P_i - P_j| \text{ with } q = \frac{1}{2}[|1 + (HPL_j - HPL_i)/|P_i - P_j|].$$

Furthermore, said step γ) also makes it possible to determine the radius HPLc of the probability space associated with said consolidated position HPLc. According to the invention, this radius HPLc is calculated on the basis of one of the following relations:

$$\text{option 1: } HPLc = \text{Max}(HPL_i, HPL_j) + \frac{1}{2}|P_i - P_j| \quad \text{a)}$$

$$\text{option 2: } HPLc = \frac{1}{2}[HPL_i + HPL_j + |P_i - P_j|]. \quad \text{b)}$$

Moreover, the consolidation scheme implemented by said means 18 can also be used to determine a first (consolidated) auxiliary reliable position or a second (consolidated) auxiliary reliable position, on the basis respectively of said first position values or of said second position values. Such a first auxiliary reliable position can be transmitted to a user system which customarily uses one of said first position values. This applies by analogy to a second auxiliary reliable position.

It will be noted that the above characteristics can also be applied to third position values which correspond to (current) inertial positions of the aircraft and which are determined by a routine inertial system comprising for example the means 14. These third position values can represent said inertial information also used by the units 10 to calculate said second position values.

This consolidation scheme can also be implemented by means 24 and 25 which are integrated respectively into said units 3 and 10, as represented in FIG. 5.

Moreover, in a particular embodiment, the consolidation scheme consists in determining a reliable position, on the basis of at least certain of the first and second valid positions, by taking account of the envisaged operational use of the reliable position thus determined.

Figure 6:
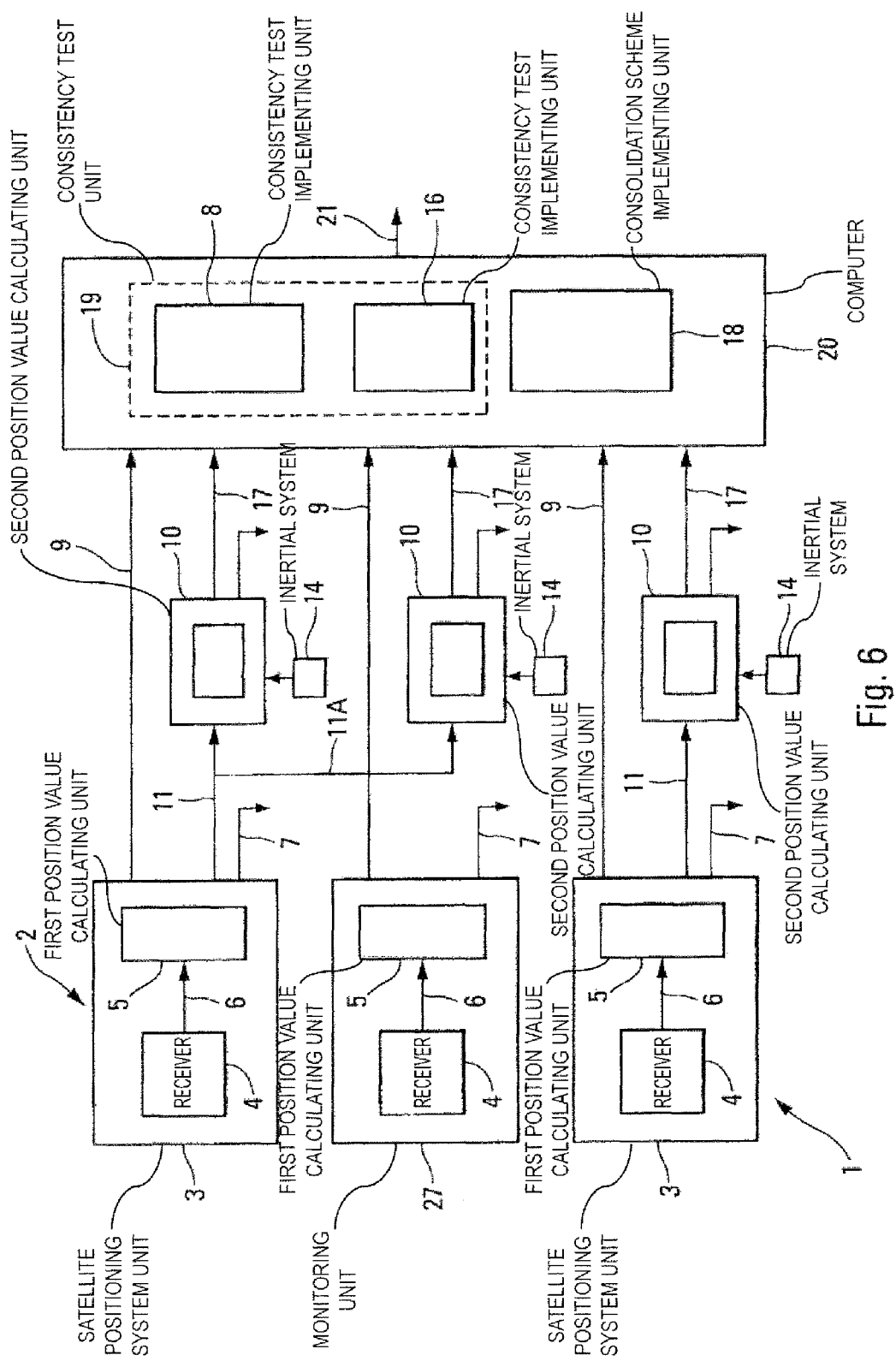

In a particular embodiment represented in FIG. 6, the device 1 comprises two units 3 such as those of FIGS. 1 and 5 which are especially intended for navigation, as well as a unit 27 which is intended only for monitoring. The first reliable position values, determined by this unit 27 which is in principle similar to the units 3, are not transmitted to a unit 10. This distinction between units 3 intended for navigation and unit 27 intended for monitoring makes it possible in general to always have a first position value, since the simultaneous loss of the position in respect of monitoring and of the position in respect of navigation is very improbable. Moreover, the device 1 can comprise two units 10 connected to the two units 3 or, as represented in FIG. 6, three units 10, two of which are then connected to one and the same unit 3 (via links 11 and 11A).

In a particular embodiment, the unit 27 is different as regards the hardware and/or as regards the software, from the units 3 so as not to be prone to the same faults. This unit 27 can, for example, be installed in an autonomous manner and possesses a dedicated antenna so as not to have any interaction with the units 3. However, in another variant embodiment, the unit 27 which is installed in an autonomous manner can share a GPS antenna with a receiver 4 of one of the units 3, in particular by virtue of the arrangement of a simple element of "signal splitter" type.

This unit 27 starts up in an autonomous manner, without external aid, and acquires the signals from the satellites of GNSS type. In a variant embodiment, this unit 27 comprises a navigation algorithm which is, however, different from those of the units 3 so as to benefit in system, from similar operation which renders the whole much more robust.

In another embodiment, the unit 27 is installed in another system on board the aircraft, such as a monitoring system, for example of TAWS type ("Terrain Awareness and Warning System"). In this case, the position calculated in the monitoring system is emitted on a bus and feeds the logic for calculating the first position values. The position used by the monitoring systems still remains the reliable position consolidated with all the available positions. It is only in a degraded case that the position of this unit 27 is used directly by the user systems of the aircraft.

The advantage of this embodiment of FIG. 6 is that the simultaneous loss of the position in respect of navigation and of that in respect of monitoring is improbable. Cases of conflicts (calculated position giving a significantly different result) between the position used for monitoring and the position used for navigation are extremely few.

Figure 7:
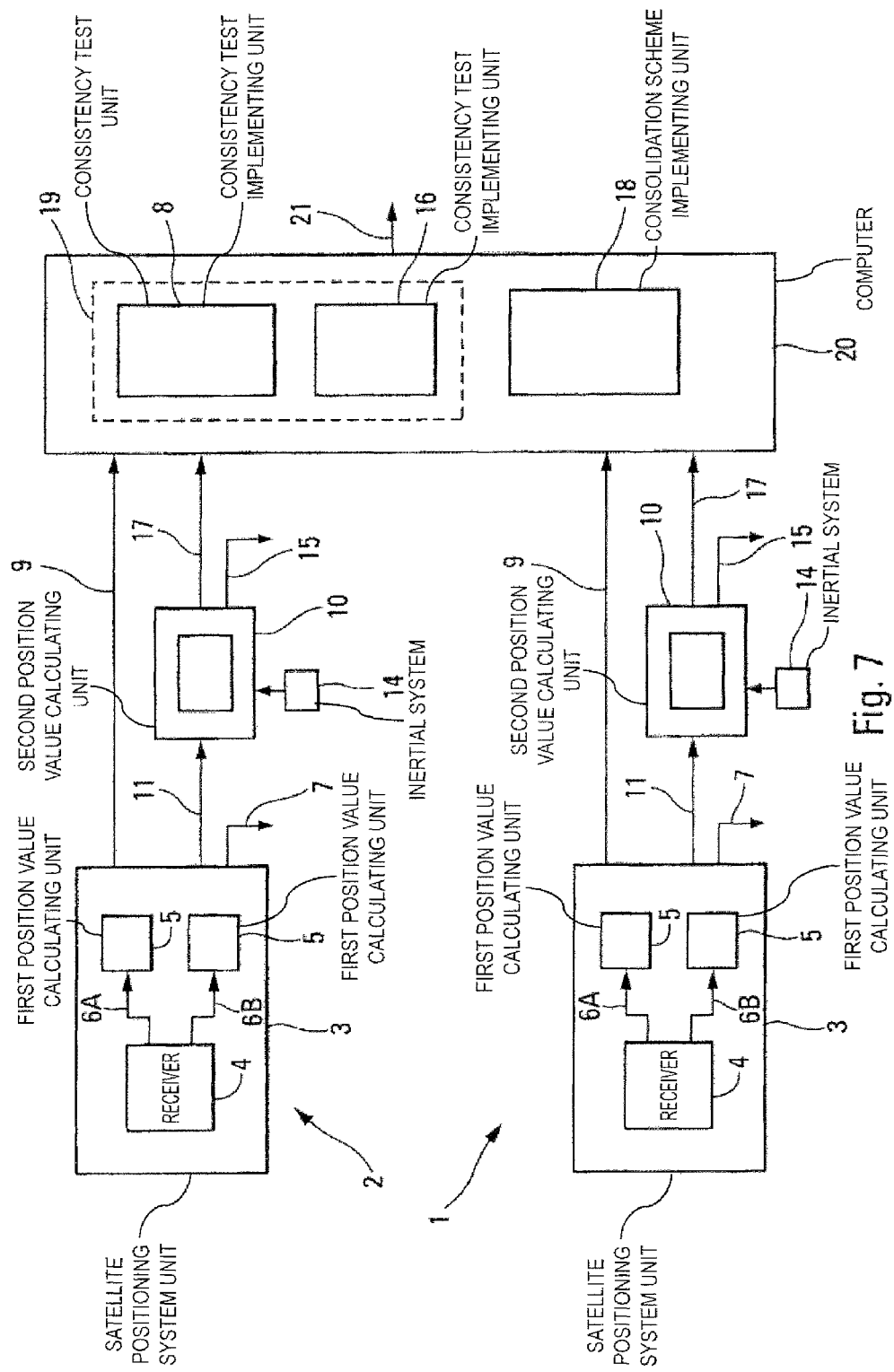

Moreover, in the example of FIG. 7, the device 1 takes into account four first position values which have been produced by four different calculation means 5. These calculation means 5 are mounted pairwise in units 3. In each unit 3, two calculation means 5 are connected respectively by way of links 6A and 6B to the receiver 4.

A doubling up of the calculation chain in each unit 3 is thus obtained as is the outputting of two first position values, with their routine performance parameters.

It will be noted that the following modifications can also be made to the units 3:

introduction of hardware dissimilarities between the two calculation means 5 so as to do away with or reduce the probabilities of the common fault modes; and doubling up of the receivers 4, and introduction of a signal splitter upstream of the receivers 4.

The invention claimed is:

1. A method for determining a reliable position of an aircraft, according to which method the following operations are carried out:
   a) producing, by a computer disposed in the aircraft, at least three first position values which each relate to a current position of the aircraft, each of the at least three first position values being produced on a basis of information arising respectively from onboard receivers which are associated with a satellite positioning system, and determining for each of the at least three first position values a probability space, each probability space being centered around a corresponding position value and defining a volume in which, with a probability greater than a predetermined threshold, an actual position of the aircraft is situated;
   b) implementing consistency tests to verify whether the at least three first position values are mutually consistent, the consistency tests making it possible to declare for each of the at least three first position values whether or not the respective first position value is valid in terms of reliability, said consistency tests comprising testing position values pairwise, each of the consistency tests comprising determining a threshold value which depends on radii of the probability spaces associated with the two tested position values and comparing a distance between the two tested position values with said threshold value and determining that a reliability problem exists if said distance is greater than the threshold value;
   c) calculating at least two second position values which each relate to the current position of the aircraft and which correspond to hybrid position values with an aid of said at least three first position values and with an aid of inertial information;
   d) implementing additional consistency tests to verify whether said at least two second position values are mutually consistent, the additional consistency tests making it possible to declare for each of said at least two second position values whether or not the respective second position value is valid in terms of reliability; and
   e) determining, on the basis of at least certain of said at least three first and the at least two second position values which have been declared valid based on the consistency tests and the additional consistency tests implemented in said operations b) and d), a reliable current position of the aircraft with the aid of a consolidation scheme.

2. The method as claimed in claim 1, further comprising indicating that a fault is responsible for a lack of reliability of a specific position value if the specific position value is declared invalid in one of operations b) and d).

3. The method as claimed in claim 1, further comprising, in operation b), determining a first auxiliary reliable position on the basis of said at least three first position values by implementing a consolidation scheme, the first auxiliary reliable position being able to be transmitted to a user system.

4. The method as claimed in claim 1, further comprising, in operation d), determining a second auxiliary reliable position on the basis of said at least two second position values by implementing a consolidation scheme, the second auxiliary reliable position being able to be transmitted to a user system.

5. The method as claimed in claim 1, further comprising, in operation c), determining said at least two second position values only with the aid of first position values which have been declared valid in operation b).

6. The method as claimed in claim 1, wherein implementing the consolidation scheme comprises:
   α) conducting consistency tests to verify all pairs of position values so as to eliminate any unreliable position value;
   β) conducting performance tests to identify, from among the position values tested in operation α), a pair of position values exhibiting the best reliability; and
   γ) calculating, on the basis of the pair of position values exhibiting the best reliability, an intermediate position value, as well as an associated probability space, the intermediate position value corresponding to said reliable current position of the aircraft.

7. The method as claimed in claim 1, wherein in operation a), two of said onboard receivers used are intended for navigation and a third of said onboard receivers used is intended only for monitoring.

8. A device configured to determine a reliable position of an aircraft, said device comprising:
   a system configured to produce at least three first position values which each relate to a current position of the aircraft, said system comprising receivers carried onboard which are associated with a satellite positioning system and which are each configured to provide information making it possible to produce the at least three first position values, a probability space being determined for each of the at least three first position values, each probability space being centered around a corresponding first position value and defining a volume in which, with a probability greater than a predetermined threshold, an actual position of the aircraft is situated;
   a first implementation section that implements consistency tests that enable verification of whether the at least three first position values are mutually consistent and make it possible to declare for each of said at least three first position values whether or not the respective first position value is valid in terms of reliability, said consistency tests consisting in testing position values pairwise, each consistency test consisting in determining a threshold value which depends on radii of the probability spaces associated with the two tested position values and in comparing a distance between the two tested position values with said threshold value so that, if said distance is greater than the threshold value, there exists a reliability problem;
   a calculation section that calculates, with an aid of said at least three first position values and with an aid of inertial information, at least two second position values which each relate to the current position of the aircraft and which correspond to hybrid position values;
   a second implementation section that implements consistency tests that (i) enable verification of whether said at least two second position values are mutually consistent and (ii) make it possible to declare for each of said at least two second position values whether or not the respective second position value is valid in terms of reliability; and
   a determination section that determines, on the basis of at least certain of said at least three first and the at least two second position values which have been declared valid by said first and second implementation sections, a reliable current position of the aircraft, by implementing a consolidation scheme.

* * * * *